United States Patent
Yajima (10) Patent No.: US 12,427,856 B2
(45) Date of Patent: Sep. 30, 2025

(54) VALVE DEVICE FOR FUEL TANK

(71) Applicant: PIOLAX, INC., Kanagawa (JP)

(72) Inventor: Kazuki Yajima, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 15 days.

(21) Appl. No.: 18/408,009

(22) Filed: Jan. 9, 2024

(65) Prior Publication Data

US 2024/0239186 A1    Jul. 18, 2024

(30) Foreign Application Priority Data

Jan. 12, 2023    (JP) .................................. 2023-002912

(51) Int. Cl.
| | |
|---|---|
| *B60K 15/035* | (2006.01) |
| *B60K 15/03* | (2006.01) |
| *B60K 15/077* | (2006.01) |
| *F16K 24/04* | (2006.01) |

(52) U.S. Cl.
CPC ...... *B60K 15/03519* (2013.01); *B60K 15/077* (2013.01); *F16K 24/044* (2013.01); *F16K 24/048* (2013.01); *B60K 2015/03289* (2013.01); *B60K 2015/0775* (2013.01)

(58) Field of Classification Search
CPC .... B60K 15/03519; B60K 2015/03289; B60K 15/077; B60K 2015/0775; F16K 24/044; F16K 24/048
See application file for complete search history.

(56) References Cited

U.S. PATENT DOCUMENTS

| | | | |
|---|---|---|---|
| 10,946,737 B2 * | 3/2021 | Iino | B60K 15/03519 |
| 2016/0091107 A1 * | 3/2016 | Kaneko | F16K 31/22 |
| | | | 137/429 |
| 2019/0210456 A1 * | 7/2019 | Walkowski | F16K 31/22 |
| 2021/0107352 A1 * | 4/2021 | Okabayashi | F16K 24/044 |

FOREIGN PATENT DOCUMENTS

JP    2010-105468 A    5/2010

* cited by examiner

*Primary Examiner* — Atif H Chaudry
(74) *Attorney, Agent, or Firm* — Paratus Law Group, PLLC (57) ABSTRACT

A valve device for a fuel tank includes: a housing in which an opening is formed in a partition wall, and a fuel vapor discharge port is provided; and a float valve. A ventilation chamber is provided with a tubular wall that is configured to communicate with the fuel vapor discharge port, and a notch is formed in a lower portion of a tip portion in an extending direction of the tubular wall. The partition wall includes a ceiling wall in which the opening is formed, and a peripheral wall extends downward from a peripheral edge of the ceiling wall. A part of the peripheral edge of the ceiling wall and a part of the peripheral wall are positioned inside the tubular wall through the notch when viewed in an axial direction of the tubular wall and a valve axial direction.

3 Claims, 10 Drawing Sheets

VALVE DEVICE FOR FUEL TANK

CROSS-REFERENCE TO RELATED APPLICATIONS

This application is based on Japanese Patent Application No. 2023-002912 filed on Jan. 12, 2023, the contents of which are incorporated herein by way of reference.

TECHNICAL FIELD

The present invention relates to a valve device for a fuel tank that is attached to a fuel tank of an automatic vehicle or the like, and that suppresses overfilling to the fuel tank and suppresses a fuel from flowing out of the fuel tank.

BACKGROUND

For example, a fuel tank of a vehicle such as an automatic vehicle is provided with a valve device (full tank regulation valve) that suppresses overfilling into the fuel tank so that a liquid level in the fuel tank does not rise above a preset full tank liquid level, and a valve device (cut valve) that suppresses a fuel in the fuel tank from leaking out of the fuel tank when the automatic vehicle tilts or rolls over, and the like.

Patent Literature 1 below discloses a fuel cutoff valve including a casing having a casing main body forming a valve chamber and a lid welded to an upper portion of the casing main body and provided with a pipe body, and a float mechanism having a float accommodated in the valve chamber.

The casing further includes a valve accommodation case and an inner lid that covers an upper portion of the valve accommodation case and forms a connection passage. The inner lid forming a connection passage is disposed at a height that reaches a pipe passage of the pipe body (see FIG. 1 of Patent Literature 1).
Patent Literature 1: JP2010-105468A The amount of a fuel supplied into the fuel tank is set according to a height of an opening formed in a partition wall of the housing and which a float valve is in contact with and separated from. That is, if the opening formed in the partition wall is high, the refueling amount into the fuel tank can be increased. A position or a portion (a fuel height when the opening is closed by the float valve) that defines a full tank position of the fuel supplied into the fuel tank is referred to as a full tank regulation level, a lock point, a shut off height (SOH), or the like.

In the case of the fuel cutoff valve of Patent Literature 1, as described above, the connection passage formed in the inner lid is at a height that reaches the pipe passage of the pipe body, and it is easy to set the SOH to be high. On the other hand, the fuel that enters a space defined between the inner lid and the lid through the connection passage is likely to flow into the pipe passage of the pipe body and is likely to leak out of the fuel tank.

Therefore, an object of the present invention is to provide a valve device for a fuel tank capable of raising a full tank regulation position and regulating fuel leakage to the outside of a fuel tank.

SUMMARY

A valve device for a fuel tank according to the present invention includes: a housing in which a valve chamber configured to communicate with an inside of the fuel tank is provided below a partition wall and a ventilation chamber configured to communicate with an outside of the fuel tank is provided above the partition wall, an opening through which the valve chamber is to communicate with the ventilation chamber is formed in the partition wall, and a fuel vapor discharge port is provided on a peripheral surface at a side of the ventilation chamber; and a float valve that is accommodated in the valve chamber so as to be able to rise and descend and that is configured to be in contact with and separated from the opening. The ventilation chamber is provided with a tubular wall that is configured to communicate with the fuel vapor discharge port and that extends from the fuel vapor discharge port toward an inside of the ventilation chamber, and a notch is formed in a lower portion of a tip portion in an extending direction of the tubular wall. The partition wall includes a ceiling wall in which the opening is formed, and a peripheral wall extends downward from a peripheral edge of the ceiling wall. A part of the peripheral edge of the ceiling wall and a part of the peripheral wall are positioned inside the tubular wall through the notch when viewed in an axial direction of the tubular wall and a valve axial direction.

DESCRIPTION OF EMBODIMENTS

Embodiment of Valve Device for Fuel Tank

Hereinafter, an embodiment of a valve device for a fuel tank according to the present invention will be described with reference to the drawings.

Figure 1:
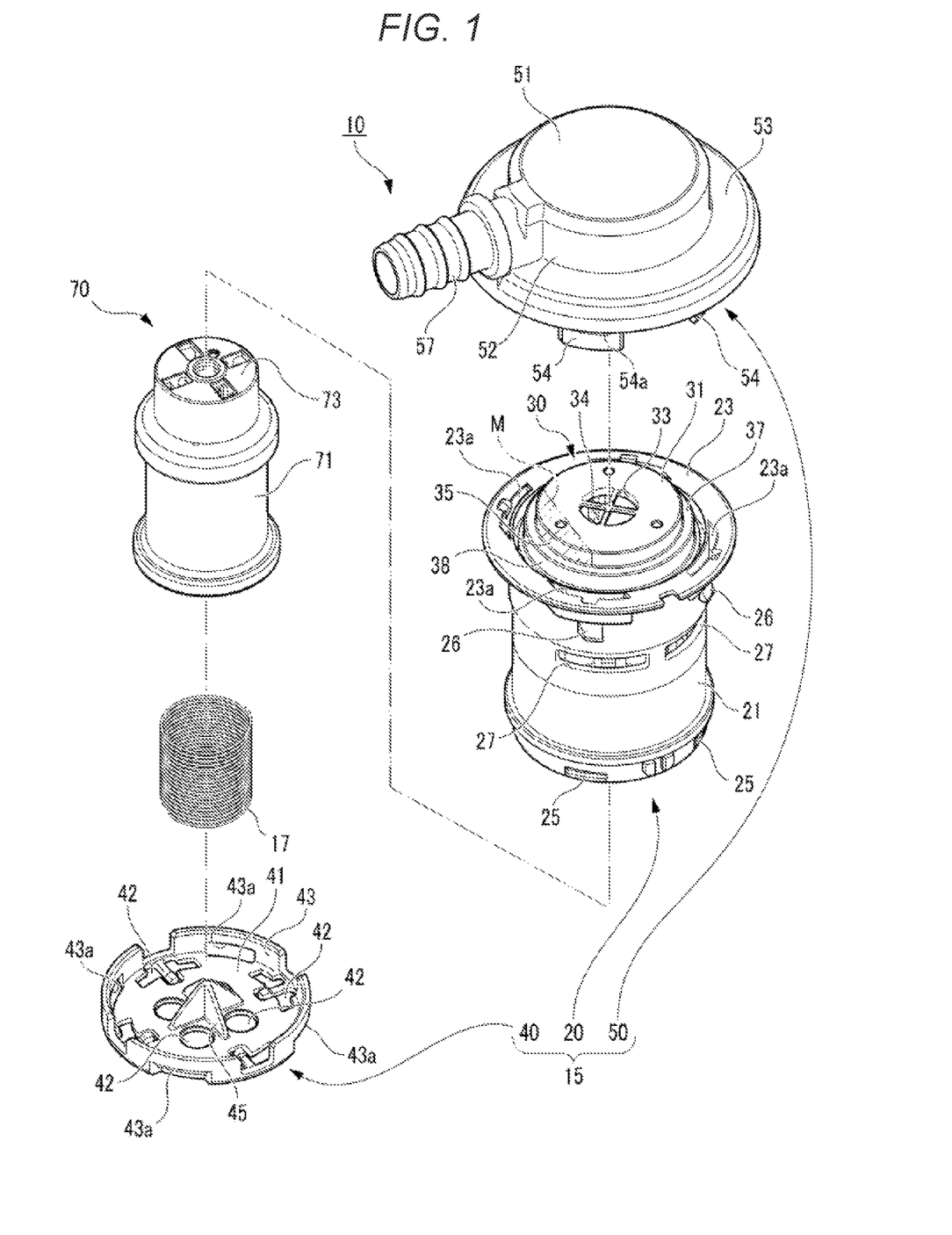
FIG. 1 is an exploded perspective view showing an embodiment of a valve device for a fuel tank according to the present invention.
Figure 2:
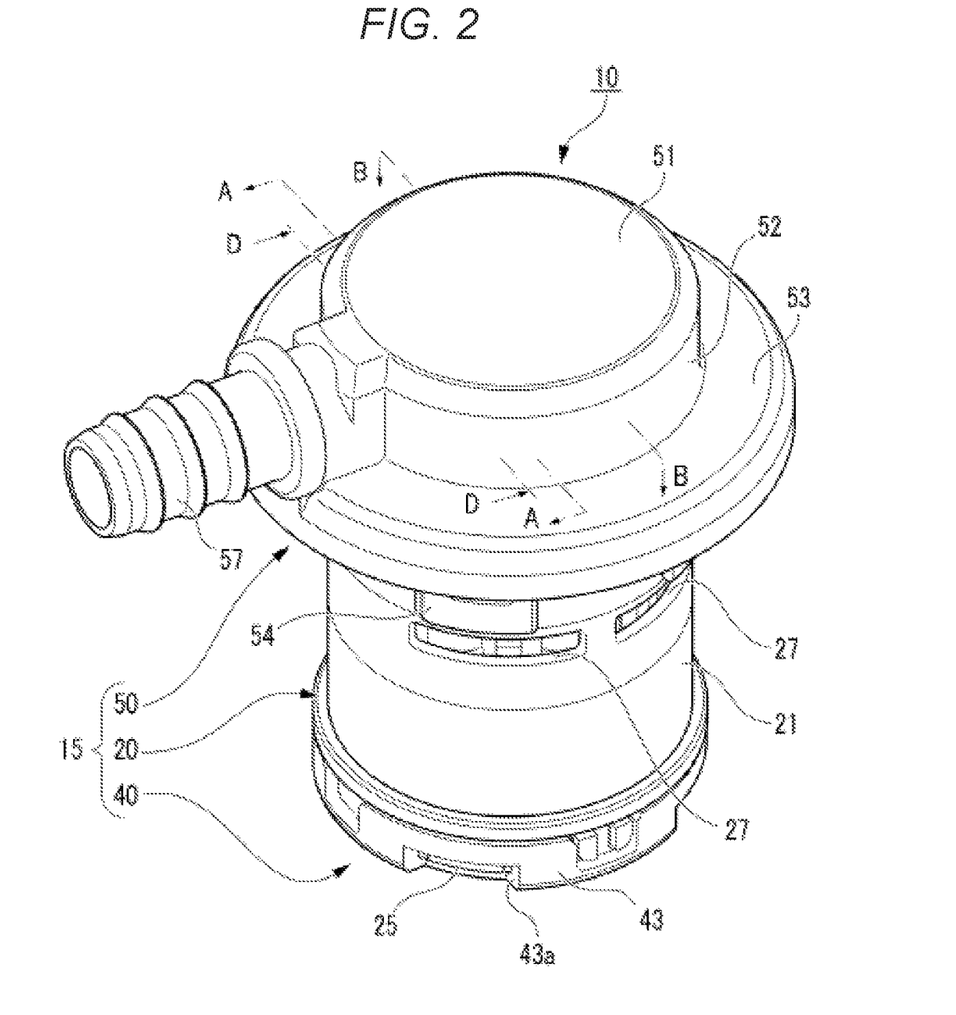
FIG. 2 is a perspective view of the valve device for the fuel tank.
Figure 5:
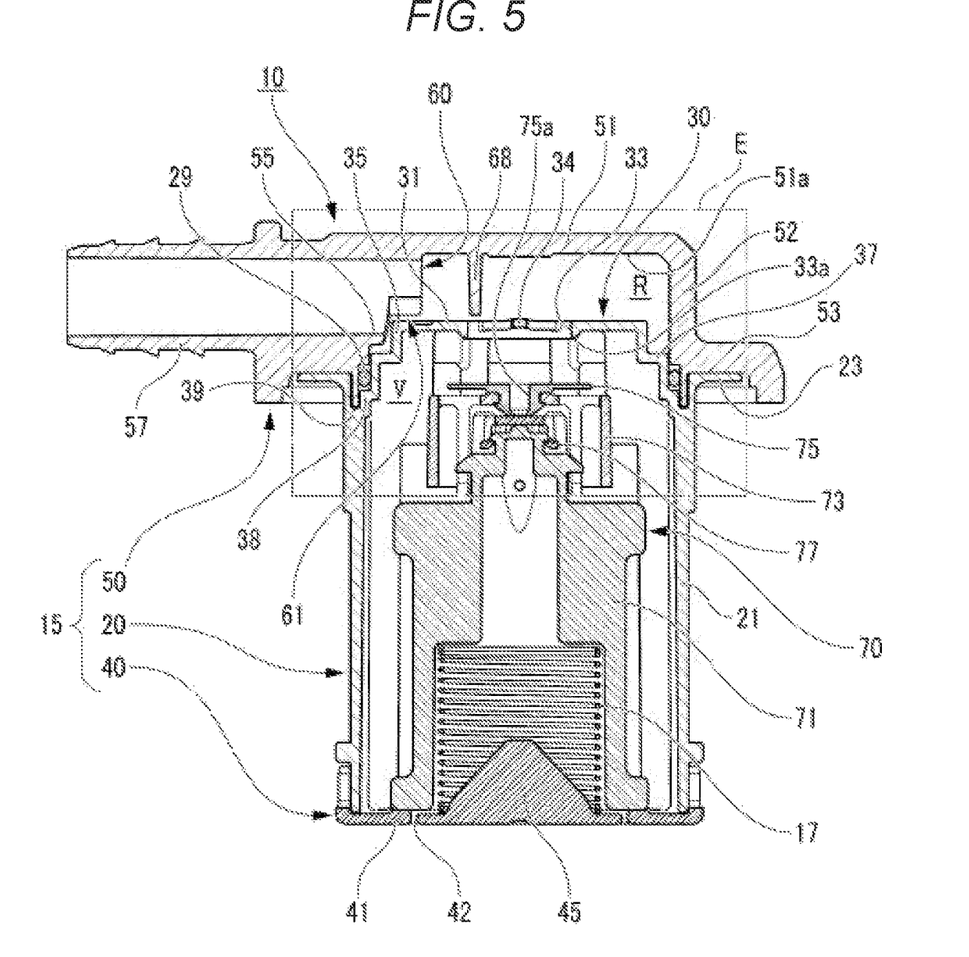
FIG. 5 is a cross-sectional view of the valve device for the fuel tank according to the present invention in a state in which a float valve descends and an opening is open.

As shown in FIGS. 1 and 5, a valve device 10 for a fuel tank (hereinafter, also simply referred to as a "valve device 10") of the present embodiment includes a housing 15 in which a valve chamber V communicating with the inside of a fuel tank is provided below a partition wall 30 and a ventilation chamber R communicating with the outside of the fuel tank is provided above the partition wall 30, an opening 33 through which the valve chamber V communicates with the ventilation chamber R is formed in the partition wall 30, and a fuel vapor discharge port 55 (hereinafter, also simply referred to as a "discharge port 55") is provided on a peripheral surface at a side of the ventilation chamber R, a float valve 70 that is accommodated in the valve chamber V so as to be able to rise and descend and closes the opening 33, and a biasing spring 17 for biasing the float valve 70.

The valve device 10 includes a fuel vapor pipe 57 (hereinafter, also simply referred to as a "pipe 57") connected to the discharge port 55 on the outside of the housing 15.

Further, the housing 15 of the present embodiment includes a housing main body 20, a lower cap 40 attached below the housing main body 20, and an upper cover 50 attached above the housing main body 20.

In the following description, a "fuel" means a liquid fuel (including fuel droplets), and "fuel vapor" means evaporated fuel. A "valve axial direction" in the present invention means an axial direction of the float valve 70 (a direction along an axial center C1 of the float valve 70) (the same applies to the following description).

First, the housing main body 20 will be described with reference to FIGS. 1, 5, and 6.

The housing main body 20 includes a main body peripheral wall 21 having a substantially cylindrical shape, and the partition wall 30 is disposed above the main body peripheral wall 21. A flange portion 23 having a substantially annular shape protrudes from a portion above the main body peripheral wall 21. A plurality of insertion holes 23a are formed in the flange portion 23.

Further, a plurality of cap-side engaging protrusions 25 protrude from an outer periphery of the main body peripheral wall 21 at positions close to a lower end portion in an axial direction. Further, a plurality of cover-side engaging protrusions 26 protrude from positions on the outer periphery of the main body peripheral wall 21 close to the flange portion 23 and aligned with the insertion holes 23a.

Flow holes 27 are formed in the main body peripheral wall 21 at portions close to the partition wall 30 to allow the inside of the fuel tank and the inside of the valve chamber V to communicate with each other. The flow hole 27 is configured to maintain a state in which the flow hole 27 is not immersed except when a vehicle tilts or rolls over, or when refueling the fuel tank, and serves as a portion through which air in the fuel tank flows into the valve chamber V.

Figure 6:
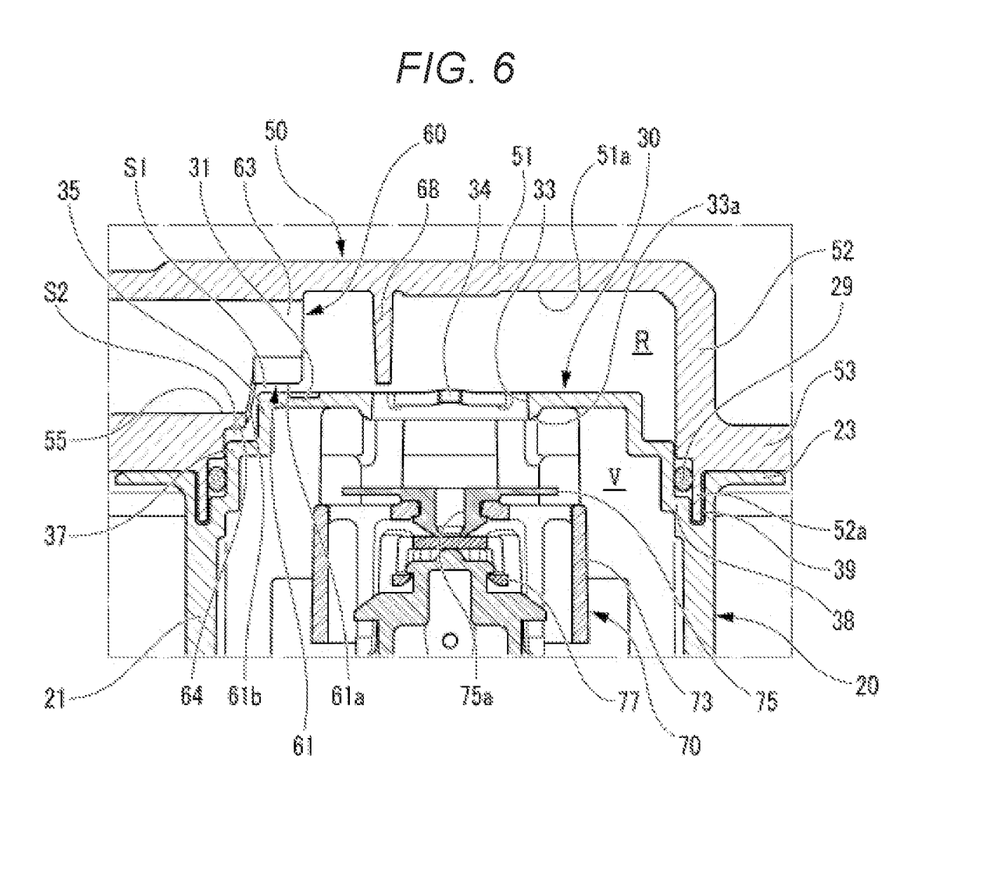
FIG. 6 is an enlarged cross-sectional view of a portion E in FIG. 5.
Figure 8:
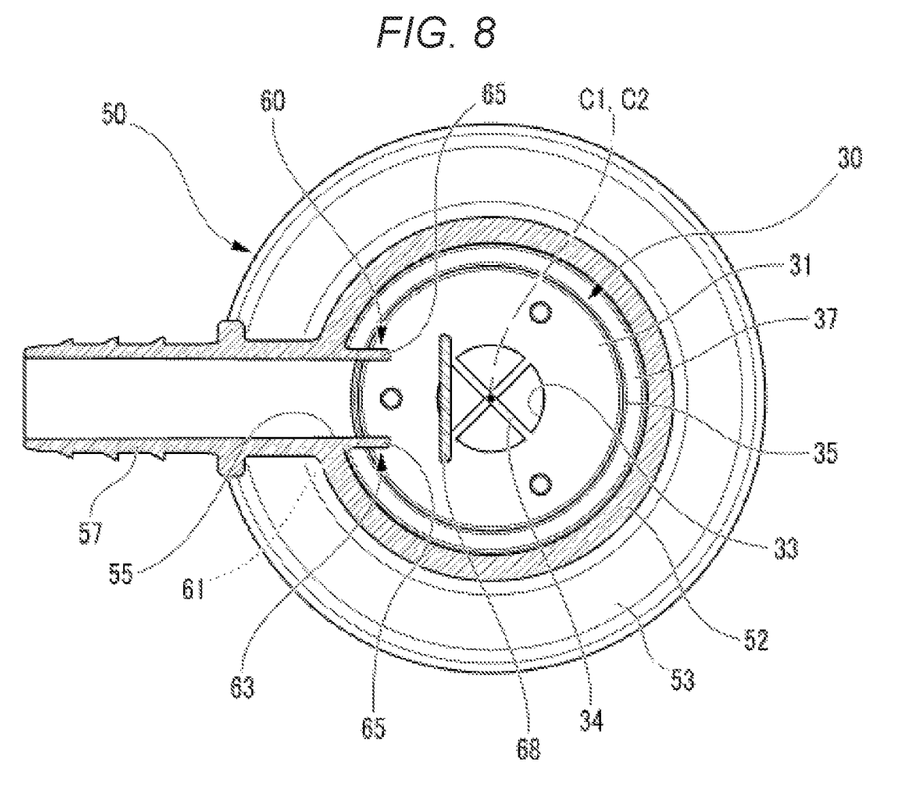
FIG. 8 is a cross-sectional view taken along line B-B in FIG. 2.

As shown in FIGS. 1, 6, and 8, the partition wall 30 includes a ceiling wall 31 having a substantially circular plate shape, a peripheral wall 35 having a substantially cylindrical shape and extending downward from an outer peripheral edge of the ceiling wall 31, and a protruding portion 37 protruding outward in a radial direction from an outer peripheral edge of a lower end of the peripheral wall 35.

The ceiling wall 31, the peripheral wall 35, and the protruding portion 37 are members related to a notch 61 of a tubular wall 60 shown in FIG. 3, and this relationship will be described in the description of the upper cover 50.

Figure 10:
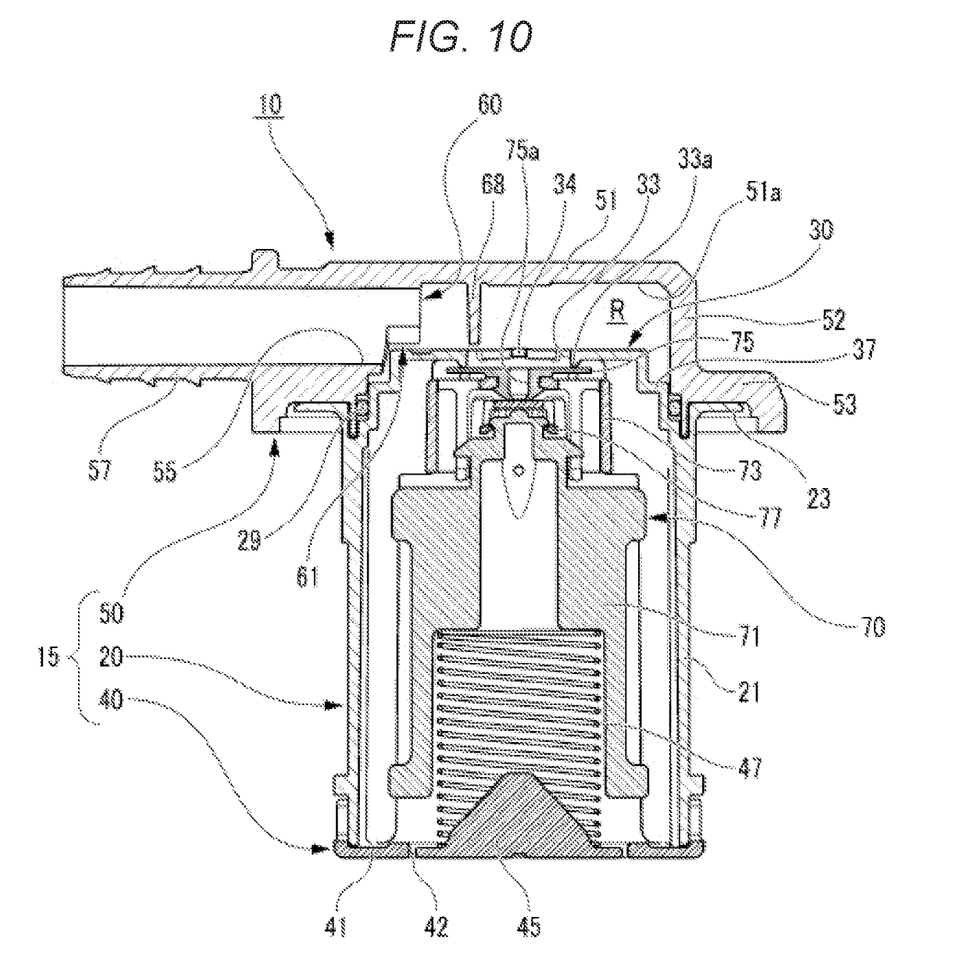
FIG. 10 is a cross-sectional view of the valve device for the fuel tank according to the present invention in a state in which the float valve rises and the opening is closed.

The opening 33 having a substantially circular hole shape is formed in a central portion in a radial direction of the ceiling wall 31. A valve seat 33a having a substantially circular protrusion shape protrudes from a back side (lower side) peripheral edge of the opening 33 (see FIG. 6). The opening 33 is opened and closed when the float valve 70 is in contact with and separated from the valve seat 33a (see FIGS. 5 and 10). A substantially cross-shaped rib 34 is provided on an inner periphery of the opening 33. The rib 34 suppresses a seal valve body 75 (see FIGS. 5, 6, and 10) from popping out from a front-side inner peripheral edge of the opening 33.

As shown in FIG. 6, a ring attachment portion 38 for attaching a seal ring 29 is provided outside the protruding portion 37, and the partition wall 30 is connected above the main body peripheral wall 21 via the ring attachment portion 38. An annular groove 39 is formed on an outer peripheral edge of the ring attachment portion 38.

Next, the lower cap 40 attached below the housing main body 20 will be described.

The lower cap 40 has a bottomed cap shape and includes a bottom wall 41 having a substantially circular plate shape and a cap peripheral wall 43 erected from an outer peripheral edge of the bottom wall 41. A plurality of through holes 42 through which the fuel tank communicates with the valve chamber V are formed in the bottom wall 41. A plurality of engaging holes 43a are formed in the cap peripheral wall 43.

A substantially cross protrusion-shaped spring support portion 45 that supports a lower end portion of the biasing spring 17 protrudes from a central portion in a radial direction of the bottom wall 41.

The lower cap 40 is attached below the housing main body 20 by engaging the corresponding cap-side engaging protrusions 25 of the housing main body 20 with the engaging holes 43a of the lower cap 40 respectively. As a result, the valve chamber V communicating with the inside of the fuel tank (not shown) is formed on a lower side of the housing 15 via the partition wall 30 (see FIG. 5).

Next, the upper cover 50 attached above the housing main body 20 will be described with reference to FIGS. 1, 3, 4, and 6 to 9.

The upper cover 50 has a substantially hat shape with an open bottom and a closed top, and includes a cover ceiling wall 51 having a substantially circular plate shape, a cover peripheral wall 52 having a substantially cylindrical shape and extending downward from an outer peripheral edge of the cover ceiling wall 51, and a cover protruding portion 53 protruding outward in a radial direction from an outer peripheral edge of a lower end of the cover peripheral wall 52.

Figure 3:
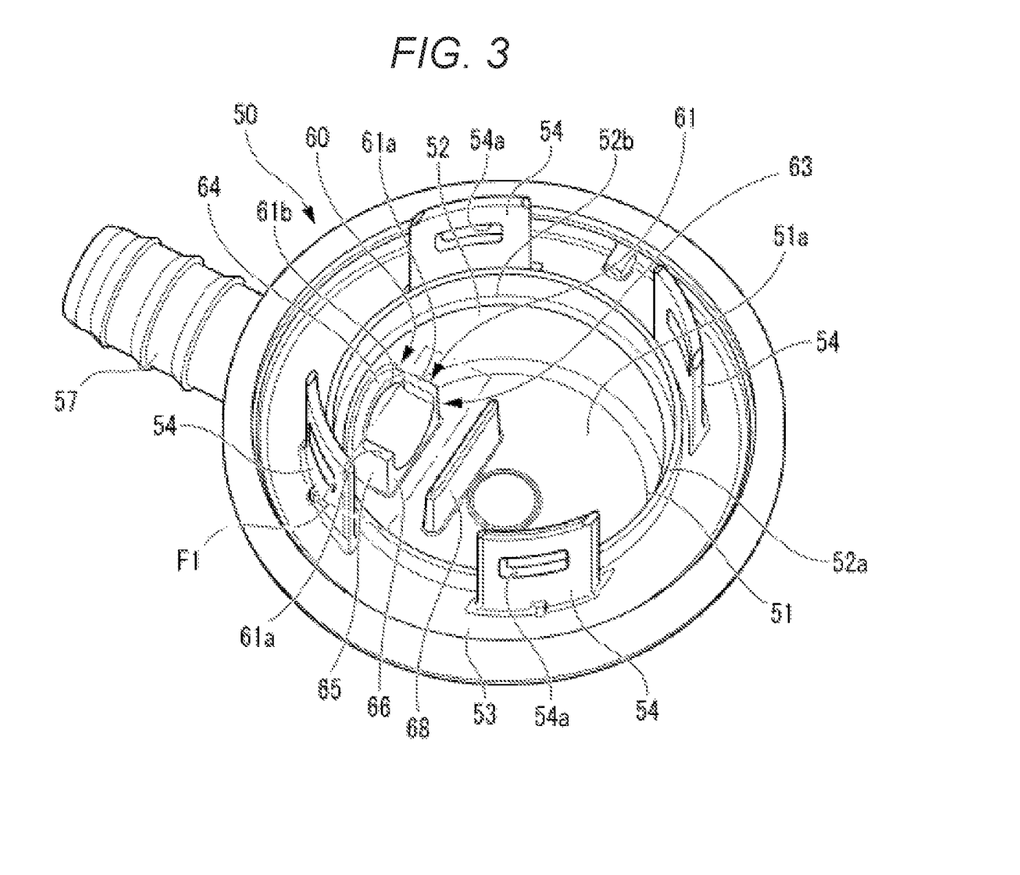
FIG. 3 is a perspective view of an upper cover constituting the valve device for the fuel tank, as viewed in a direction different from that in FIG. 1.
Figure 4:
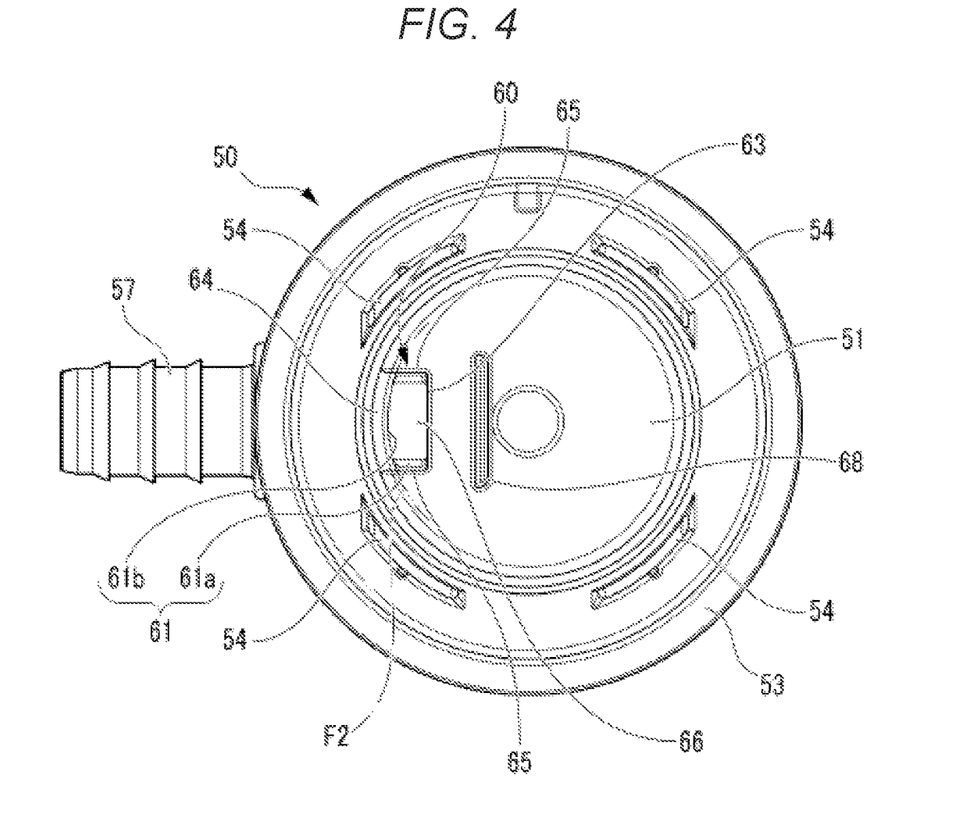
FIG. 4 is a bottom view of the upper cover.

A lower end portion 52a of the cover peripheral wall 52 has a cylindrical shape having a diameter larger than that of a portion other than the lower end portion 52a via a stepped portion 52b (see FIG. 3). Further, an inner surface of the cover ceiling wall 51, that is, a surface of the cover ceiling wall 51 facing the partition wall 30 forms a ceiling surface 51a.

As shown in FIG. 3, a plurality of engaging pieces 54 are provided downward from an inner peripheral edge (a portion close to an outer periphery of the lower end portion 52a of the cover peripheral wall 52) of the cover protruding portion 53. Each of the engaging pieces 54 has an engaging hole 54a formed therein.

The engaging pieces 54 of the upper cover 50 are inserted through the corresponding insertion holes 23a of the housing main body 20, and the corresponding cover-side engaging protrusions 26 are respectively engaged with the engaging holes 54a.

As a result, as shown in FIG. 6, when the lower end portion 52a of the cover peripheral wall 52 of the upper cover 50 is inserted into the annular groove 39 of the housing main body 20, and the lower end portion 52a of the cover peripheral wall 52 abuts against an outer periphery of the seal ring 29 externally attached to the ring attachment portion 38 with the seal ring 29 clamped between the lower end 52a and the ring attachment portion 38, the upper cover 50 is attached above the housing main body 20.

Thus, the ventilation chamber R communicating with the outside of the fuel tank is formed above the partition wall 30 (see FIG. 5).

The discharge port 55 having a substantially circular hole shape is formed at a predetermined portion in a peripheral direction of the cover peripheral wall 52 so as to penetrate through the cover peripheral wall 52. Further, the pipe 57 extends by a predetermined length from a front-side peripheral edge of the discharge port 55 of the cover peripheral wall 52. The pipe 57 communicates with the discharge port 55.

The ventilation chamber R is provided with the tubular wall 6i0 that communicates with the discharge port 55 and extends from the discharge port 55 toward the inside of the ventilation chamber R, and the notch 61 is formed in a lower portion of a tip portion in the extending direction of the tubular wall 60.

The notch 61 in the present embodiment has a curved surface shape (arc shape) curved along a peripheral direction at a bottom portion of the tubular wall 60, extends by a predetermined length in the extending direction of the tubular wall 60, and is formed by cutting out the bottom portion of the tip portion in the extending direction of the tubular wall 60.

Specifically, the lower portion of the tip portion in the extending direction of the tubular wall 60, that is, the bottom portion (a portion positioned opposite to the ceiling surface 51a) in the peripheral direction of the tubular wall 60 is cut out at a horizontal cut surface F1 (see FIG. 3) along a horizontal direction, and a portion adjacent to the horizontal cut surface F1 at the lower portion of the tip portion in the extending direction of the tubular wall 60, is cut out at a vertical cut surface F2 (see FIG. 4) along an inner peripheral surface of the cover peripheral wall 52 orthogonal to the horizontal cut surface F1 and having an arc shape.

That is, the notch 61 of the present embodiment includes horizontal notches 61a and 61a cutout at the horizontal cut surface F1, and a vertical notch 61b cutout at the vertical cut surface F2.

The tubular wall 6i0 has a shape in which the lower portion of the tip portion in the extending direction opens through the notch 61 including a pair of horizontal notches 61a and 61a and the vertical notch 61b.

Further, a portion of the tubular wall 60 closer to the ceiling surface 51a than a portion cut out by the pair of horizontal notches 61a and 61a of the notch 61 forms an upward extending portion 63. A portion of the tubular wall 60 at a base end portion in the extending direction and closer to the bottom portion of the tubular wall 60 than the vertical notch 61b of the notch 61 forms a downward extending portion 64.

Further, it can be said that the tubular wall 60 is formed as follows.

Specifically, a pair of side walls 65 whose outer surfaces are parallel to each other extend from an inner peripheral edge of the discharge port 55 at a side of the ventilation chamber R toward the inside of the ventilation chamber R, and the pair of side walls 65 and 65 are connected to each other by a connection wall 66 that is connected to the ceiling surface 51a and whose inner periphery has an arc shape.

Portions of the pair of side walls 65 and 65 close to bottom portions of tip portions in the extending direction are cut out at the horizontal cut surface F1, so that the horizontal notches 61a and 61a of the notch 61 are positioned on lower end surfaces of the tip portions of the pair of side walls 65 and 65 in the extending direction, and the upward extending portion 63 is formed through the notch 61.

That is, the upward extending portion 63 includes the tip portions in the extending direction of the pair of side walls 65 and 65 and a portion of the connection wall 66 that connects the tip portions in the extending direction of the pair of side walls 65 and 65. The upward extending portion 63 has a shape in which a tip in the extending direction and a bottom portion facing the ceiling wall 31 of the partition wall 30 are open.

Further, the bottom portion of the base end portion in the extending direction of the tubular wall 60, which is a portion adjacent to the tip portions in the extending direction of the pair of side walls 65 and 65 constituting the upward extending portion 63, is cur out at the vertical cut surface F2, so that the downward extending portion 64 having an arc shape is formed through the vertical notch 61b of the notch 61.

The downward extending portion 64 is provided at a portion that is displaced in an axial direction of the tubular wall 60 (positioned on the base end portion in the extending direction of the tubular wall 60) with respect to the upward extending portion 63 and faces the tubular wall 60 in a radial direction.

In the valve device 10, a part of a peripheral edge of the ceiling wall 31 and a part of the peripheral wall 35 are positioned inside the tubular wall 60 through the notch 61 when viewed in the axial direction of the tubular wall 60 and the valve axial direction.

Figure 7:
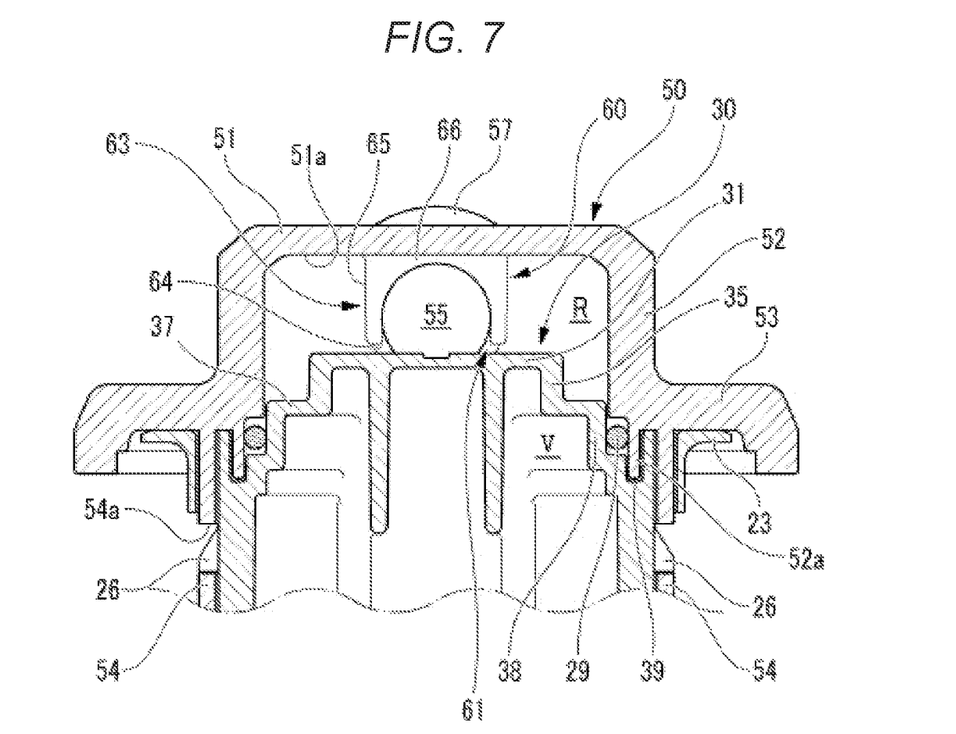
FIG. 7 is a cross-sectional view taken along line A-A in FIG. 2.

In the case of the present embodiment, as shown in FIG. 7, when viewed in an axial direction of the pipe 57, a predetermined portion in a peripheral direction including the peripheral edge of the ceiling wall 31 and a predetermined portion of the peripheral wall 35 in the predetermined portion (a portion surrounded by an arc along the peripheral direction of the outer peripheral edge of the ceiling wall 31 and the peripheral wall 35 and a chord connecting both ends of the arc, indicated by a reference sign M in FIG. 1, and also referred to as "entering portion M" in the following description) are positioned in the notch 61, and as shown in FIG. 8, when viewed in the valve axial direction, the entering portion M of the ceiling wall 31 and the peripheral wall 35 is positioned in the notch 61.

As a result, the entering portion M, which is a part of the ceiling wall 31 and a part of the peripheral wall 35, is positioned inside the tubular wall 60 through the notch 61 when viewed in the axial direction of the tubular wall 60 and the valve axial direction (see FIGS. 7 and 8).

As shown in FIG. 8, the upward extending portion 63 constituting the tubular wall 60 is disposed so as to overlap with the ceiling wall 31 constituting the partition wall 30 when the tubular wall 60 is viewed in the valve axial direction.

Further, as shown in FIG. 6, a gap S2 is formed between the protruding portion 37 of the partition wall 30 and the downward extending portion 64 in the valve axial direction. Specifically, the gap S2 is formed between an upper surface of the protruding portion 37 and a lower surface of a bottom portion of the downward extending portion 64 (the gap S2 is formed at a predetermined interval in the valve axial direction).

Similarly, as shown in FIG. 6, a gap S1 is formed between the ceiling wall 31 of the partition wall 30 and the upward extending portion 63 in the valve axial direction. Specifically, the gap S1 is formed between an upper surface of the ceiling wall 31 and lower end surfaces (surfaces where the horizontal notches 61a are positioned) of the pair of side walls 65 and 65 constituting the upward extending portion 63 (the gap S1 is formed at a predetermined interval in the valve axial direction).

The gap S1 between the ceiling wall 31 and the upward extending portion 63 is smaller than the gap S2 between the protruding portion 37 and the downward extending portion 64.

As shown in FIGS. 3, 5, and 6, an inflow regulation wall 68 regulating the inflow of a fuel into the discharge port 55 extends from the ceiling surface 51a of the ventilation chamber R toward the ceiling wall 31.

The inflow regulation wall 68 in the present embodiment is formed in a substantially elongated plate shape with an area capable of roughly covering an opening at a tip in the extending direction of the tubular wall 60, here, an opening at the tip of the upward extending portion 63, and is provided from the ceiling surface 51a of the cover ceiling wall 51 of the upper cover 50 toward the ceiling wall 31 of the partition wall 30.

As shown in FIG. 8, when viewed in the valve axial direction from the ceiling surface 51a of the ventilation chamber R, the inflow regulation wall 68 is disposed at a position between the tip of the upward extending portion 63 and a center C2 of the housing 15 that coincides with the axial center C1 of the float valve 70 (also referred to as a center in the radial direction of the ceiling wall 31 of the partition wall 30) and separated from the tip of the upward extending portion 63. As shown in FIG. 8, when viewed in the valve axial direction from the ceiling surface 51a of the ventilation chamber R, the inflow regulation wall 68 is disposed in a direction orthogonal to the extending direction of the upward extending portion 63.

Figure 9:
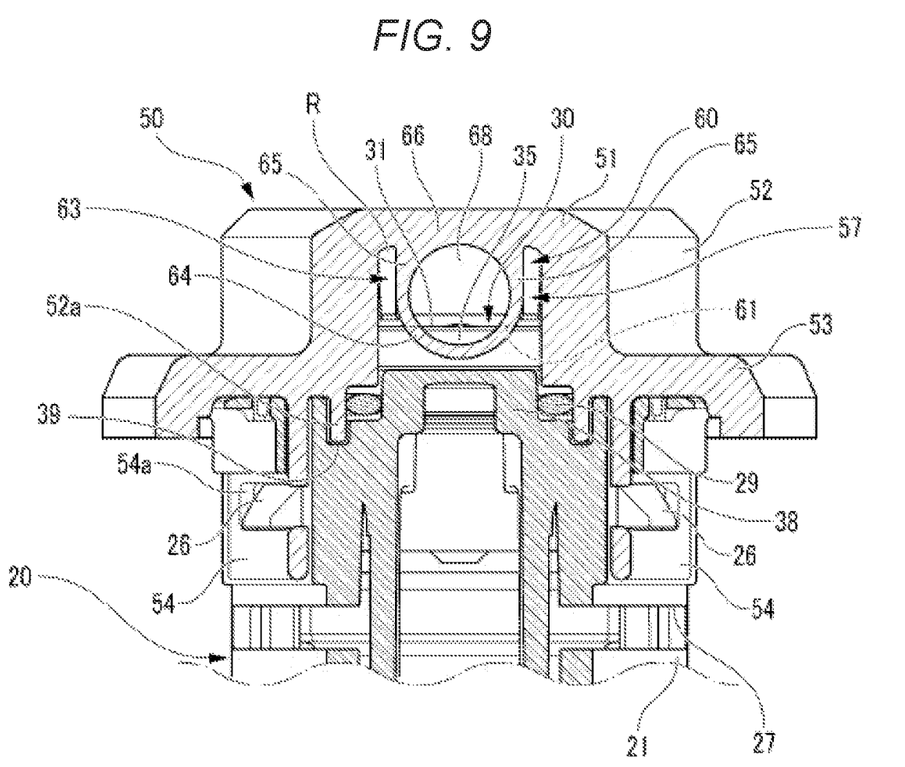
FIG. 9 is a cross-sectional view taken along line D-D in FIG. 2.

Further, as shown in FIG. 9, when viewed in the axial direction of the tubular wall 60, an upper portion of the tubular wall 60 is covered by the inflow regulation wall 68, and a lower portion of the tubular wall 60 is covered by the peripheral wall 35 of the partition wall 30.

More specifically, as shown in FIG. 9, when the inside of the ventilation chamber R is viewed from a tip in an extending direction of the pipe 57, a range from an upper half portion of the tubular wall 60 (a portion above a center in the radial direction of the tubular wall 60) to a portion slightly below the center in the radial direction of the tubular wall 60 is covered with the inflow regulation wall 68, and a predetermined range of a lower half portion of the tubular wall 60 (a portion below the center in the radial direction of the tubular wall 60 and below a lower end surface of the inflow regulation wall 68) is covered with the peripheral wall 35.

Next, the float valve 70 accommodated in the valve chamber V so as to be able to rise and descend will be described with reference to FIGS. 1, 5, and 6.

As shown in FIGS. 1 and 5, the float valve 70 of the present embodiment includes a float main body 71 that generates buoyancy when the float valve 70 is immersed in a fuel, and a seal member 73 that is attached above the float main body 71, rises and descends relative to the float main body 71, and is in contact with and separated from the opening 33 of the partition wall 30.

The seal valve body 75 made of an elastic material such as rubber or an elastic elastomer is attached above the seal member 73. A ventilation hole 75a with an opening at an upper side and a lower side penetrates through the center of the seal valve body 75. The seal valve body 75 is in contact with and separated from the valve seat 33a of the opening 33 to open and close the opening 33, whereby the float valve 70 functions as a full tank regulation valve.

Further, between the float main body 71 and the seal member 73, an intermediate valve body 77 is supported so as to be tiltable. The intermediate valve body 77 normally abuts against a lower end portion of the seal valve body 75 to close the ventilation hole 75a (see FIGS. 5 and 6) and opens the vent hole 75a when the float main body 71 descends with respect to the seal member 73.

The float valve 70 is accommodated and disposed in the valve chamber V so as to be able to rise and descend in a state in which the biasing spring 17 is interposed between the float valve 70 and the lower cap 40. The float valve 70 rises due to the buoyancy thereof and a biasing force of the biasing spring 17 when immersed in a fuel, and descends due to a weight thereof when not immersed in a fuel.

(Modification)

Shapes, structures, layouts, and the like of the housing constituting the present invention, the housing main body constituting the housing, the partition wall, the lower cap, the upper cover, the tubular wall, the float valve, and the like are not limited to the above aspects.

The housing 15 in the above embodiment includes the housing main body 20, the lower cap 40, and the upper cover 50, but the housing may include at least a partition wall.

Further, in the present embodiment, the main body peripheral wall 21 of the housing main body 20, the peripheral wall 35 of the partition wall 30, the cover peripheral wall 52 of the upper cover 50, and the like have a substantially cylindrical shape, but the shape may be an elliptical cylindrical shape, an angular cylindrical shape, and the like, for example.

The float valve 70 in the present embodiment has a multi-component configuration including the float main body 71, the seal member 73, the intermediate valve body 77, and the like, but the float valve may be, for example, a float valve in which a seal member made of an elastic material is attached on an upper side, and may be any valve as long as the opening 33 can be opened and closed.

Further, in the present embodiment, one float valve 70 is accommodated and disposed in one valve chamber V formed in the housing 15, but a plurality of float valves may be accommodated and disposed in one valve chamber (the float valves function as a fuel cut valve, a pressure adjustment valve, or the like in addition to the full tank regulation valve), or a plurality of valve chambers may be defined in a housing and each valve chamber has a float valve accommodated and disposed therein, for example.

The partition wall 30 in the present embodiment includes the ceiling wall 31, the peripheral wall 35, the protruding portion 37, the ring attachment portion 38, and the like, and the partition wall 30 has a stepped shape in which an outer periphery thereof gradually expands in diameter downward from the ceiling wall 31, but the partition wall may include at least a ceiling wall and a peripheral wall.

Further, the notch 61 of the tubular wall 60 in the present embodiment has a curved surface shape curved along a peripheral direction at a bottom portion of the tubular wall 60 and has a shape extending by a predetermined length in an extending direction of the tubular wall 60, but the notch may be, for example, a substantially trapezoidal shape, a substantially U shape, a substantially V shape, or the like by cutting a bottom portion of a tubular wall only by a cut surface along a horizontal direction, or by cutting the bottom portion of the tubular wall by an arc-shaped cut surface, and appropriately combining the cut surface in the horizontal direction, the arc-shaped cut surface, the cut surface inclined with respect to an extending direction of the tubular wall, or the like, and the shape is not particularly limited as long as a part of a peripheral edge of the ceiling wall and a part of the peripheral wall can enter the notch.

The inflow regulation wall 68 in the present embodiment has a substantially elongated plate shape, but the inflow regulation wall may have, for example, a semicircular shape, a trapezoidal shape, a rectangular shape, or the like, or a substantially U-shaped frame shape, a substantially V-shaped frame shape, or the like when viewed in a valve axial direction, and may have a shape capable of regulating the inflow of a fuel into a discharge port.

Operation and Effect

Next, operations and effects of the valve device 10 having the above structure will be described.

As shown in FIG. 5, when the fuel tank is not sufficiently filled with a fuel and the float valve 70 is not immersed in the fuel, the float valve 70 descends due to a weight thereof and the opening 33 opens, and thus the valve chamber V and the ventilation chamber R communicate with each other through the opening 33.

When refueling the fuel tank in this state, air in the fuel tank mainly flows into the valve chamber V from the through holes 42 of the lower cap 40, flows upward through gaps between the float valve 70, the cap peripheral wall 43 of the lower cap 40, and the main body peripheral wall 21 of the housing main body 20, flows into the ventilation chamber R from the opening 33, and is discharged to a canister outside the fuel tank. In this way, the air in the fuel tank is discharged to the outside of the fuel tank, making it possible to refuel the fuel tank.

When refueling the fuel tank from the state shown in FIG. 5, the fuel flows into the valve chamber V from the through holes 42 of the lower cap 40, and the float main body 71 of the float valve 70 is immersed in the fuel.

When the fuel reaches a preset SOH (also referred to as a lock point, a full tank regulation level, or the like), that is, when the flow holes 27 provided in the housing main body 20 are closed and are immersed, the float valve 70 rapidly rises due to a biasing force of the biasing spring 17 and the buoyancy of the float main body 71 of the float valve 70, the seal valve body 75 abuts against the valve seat 33a, and the opening 33 is closed.

As a result, the air flow between the valve chamber V and the ventilation chamber R through the opening 33 is blocked. Then, the fuel in the fuel tank rises along a refueling pipe provided in the fuel tank and comes into contact with a full tank detection sensor of a refueling nozzle inserted into a refueling port to detect full tank, and thus refueling to the fuel tank is stopped and the full tank can be regulated.

At this time, in the valve device 10, as shown in FIGS. 7 and 8, a part of the peripheral edge of the ceiling wall 31 and a part of the peripheral wall 35 constituting the partition wall 30 are positioned inside the tubular wall 60 through the notch 61 when viewed in the axial direction of the tubular wall 60 and the valve axial direction. Therefore, since the opening 33 formed in the partition wall 30 can be positioned on an upper side inside the housing 15, a full tank regulation position can be raised.

On the other hand, although the fuel is likely to flow into the discharge port 55 from the opening 33, a part of the peripheral wall 35 constituting the partition wall 30 is positioned inside the tubular wall 60, so that an opening area of the discharge port 55 can be reduced. Therefore, the fuel is less likely to flow into the pipe 57 through the discharge port 55 and is less likely to leak out of the tank.

As described above, in the valve device 10, it is possible to achieve an effect of raising the full tank regulation position and a conflicting effect of regulating fuel leakage to the outside of the fuel tank.

In the present embodiment, the tubular wall 60 is formed with the upward extending portion 63 through the notch 61, and the upward extending portion 63 is disposed so as to overlap with the ceiling wall 31 when viewed in the valve axial direction (see FIG. 8). Further, the inflow regulation wall 68 regulating the inflow of a fuel into the discharge port 55 extends from the ceiling surface 51a of the ventilation chamber R toward the ceiling wall 31, and when viewed in the valve axial direction from the ceiling surface 51a of the ventilation chamber R, the inflow regulation wall 68 is disposed at a position between the tip of the upward extending portion 63 and the center C2 of the housing 15 that coincides with the axial center C1 of the float valve 70 and separated from the tip of the upward extending portion 63 (see FIG. 8).

According to the above aspect, the fuel flowing into the ventilation chamber R before the float valve 70 rises to close the opening 33 collides with the inflow regulation wall 68 and diffuses, and then further collides with the upward extending portion 63 and falls, so that the fuel is less likely to flow into the pipe 57 from the discharge port 55, and leakage of the fuel to the outside of the fuel tank can be more appropriately regulated.

Since the inflow regulation wall 68 and the tip of the upward extending portion 63 are separated from each other, air permeability can be maintained. Therefore, there is no problem with the performance of discharging the air inside the fuel tank when the fuel is supplied into the fuel tank, and the ceiling wall 31 in which the opening 33 is formed can be positioned as high as possible inside the housing 15.

Therefore, the effects of raising the full tank regulation position and regulating fuel leakage to the outside of the fuel tank can be further enhanced.

Further, in the present embodiment, when viewed in the axial direction of the tubular wall 60, the upper portion of the tubular wall 60 is covered by the inflow regulation wall 68, and the lower portion of the tubular wall 60 is covered by the peripheral wall 35 (see FIG. 9).

According to the above aspect, when viewed in the axial direction of the tubular wall 60, since the upper portion of the tubular wall 60 is covered by the inflow regulation wall 68 and the lower portion of the tubular wall 60 is covered by the peripheral wall 35, the fuel flowing into the ventilation chamber R before the float valve 70 rises to close the opening 33 is less likely to flow into the pipe 57 from the discharge port 55, and leakage of the fuel to the outside of the fuel tank can be more appropriately regulated.

Further, in the present embodiment, the protruding portion 37 protrudes from the outer peripheral edge of the lower end of the peripheral wall 35 of the partition wall 30, the tubular wall 60 is formed with the upward extending portion 63 and the downward extending portion 64 through the notch 61, the gaps S2 and S1 are formed in the valve axial direction between the protruding portion 37 and the downward extending portion 64 and between the ceiling wall 31 and the upward extending portion 63, respectively, and the gap S1 between the ceiling wall 31 and the upward extending portion 63 is smaller than the gap S2 between the protruding portion 37 and the downward extending portion 64 (see FIG. 6).

According to the above aspect, the fuel flowing into the ventilation chamber R can be collected by the gap S2 formed between the protruding portion 37 and the downward extending portion 64. Since the gap S1 between the ceiling wall 31 and the upward extending portion 63 is smaller than the gap S2 between the protruding portion 37 and the downward extending portion 64, the fuel collected in the gap S2 between the protruding portion 37 and the downward extending portion 64 is less likely to escape, and the fuel is less likely to flow into the pipe 57 from the discharge port 55.

The present invention is not limited to the embodiment described above, various modifications can be made within the scope of the gist of the present invention, and such embodiments are also included in the scope of the present invention.

What is claimed is:

1. A valve device for a fuel tank comprising:
a housing in which a valve chamber configured to communicate with an inside of the fuel tank is provided below a partition wall and a ventilation chamber configured to communicate with an outside of the fuel tank is provided above the partition wall, an opening through which the valve chamber is to communicate with the ventilation chamber is formed in the partition wall, and a fuel vapor discharge port is provided on a peripheral surface at a side of the ventilation chamber; and
a float valve that is accommodated in the valve chamber so as to be able to rise and descend and that is configured to be in contact with and separated from the opening, wherein
the ventilation chamber is provided with a tubular wall that is configured to communicate with the fuel vapor discharge port and that extends from the fuel vapor discharge port toward an inside of the ventilation chamber, and a notch is formed in a lower portion of a tip portion in an extending direction of the tubular wall,
the partition wall includes a ceiling wall in which the opening is formed, and a peripheral wall extends downward from a peripheral edge of the ceiling wall,
a part of the peripheral edge of the ceiling wall and a part of the peripheral wall are positioned inside the tubular wall through the notch when viewed in an axial direction of the tubular wall and a valve axial direction,
the tubular wall is formed with an upward extending portion through the notch, and the upward extending portion is disposed so as to overlap with the ceiling wall when viewed in the valve axial direction,
an inflow regulation wall configured to regulate inflow of fuel into the fuel vapor discharge port extends from a ceiling surface of the ventilation chamber toward the ceiling wall, and
when viewed in the valve axial direction from the ceiling surface of the ventilation chamber, the inflow regulation wall is disposed at a position between a tip of the upward extending portion and a center of the housing that coincides with an axial center of the float valve, the position being separated from the tip of the upward extending portion.

2. The valve device for the fuel tank according to claim 1, wherein
when viewed in the axial direction of the tubular wall, an upper portion of the tubular wall is covered by the inflow regulation wall, and a lower portion of the tubular wall is covered by the peripheral wall.

3. A valve device for a fuel tank comprising:
a housing in which a valve chamber configured to communicate with an inside of the fuel tank is provided below a partition wall and a ventilation chamber configured to communicate with an outside of the fuel tank is provided above the partition wall, an opening through which the valve chamber is to communicate with the ventilation chamber is formed in the partition wall, and a fuel vapor discharge port is provided on a peripheral surface at a side of the ventilation chamber; and
a float valve that is accommodated in the valve chamber so as to be able to rise and descend and that is configured to be in contact with and separated from the opening, wherein
the ventilation chamber is provided with a tubular wall that is configured to communicate with the fuel vapor discharge port and that extends from the fuel vapor discharge port toward an inside of the ventilation chamber, and a notch is formed in a lower portion of a tip portion in an extending direction of the tubular wall,
the partition wall includes a ceiling wall in which the opening is formed, and a peripheral wall extends downward from a peripheral edge of the ceiling wall,
a part of the peripheral edge of the ceiling wall and a part of the peripheral wall are positioned inside the tubular wall through the notch when viewed in an axial direction of the tubular wall and a valve axial direction,
a protruding portion protrudes from an outer peripheral edge of a lower end of the peripheral wall,
an upward extending portion and a downward extending portion are formed on the tubular wall through the notch,
gaps are formed in the valve axial direction between the protruding portion and the downward extending portion and between the ceiling wall and the upward extending portion, respectively, and
the gap between the ceiling wall and the upward extending portion is smaller than the gap between the protruding portion and the downward extending portion.

* * * * *